C. TODD.
AUTOMOBILE BRAKE.
APPLICATION FILED JUNE 25, 1909.
937,557.
Patented Oct. 19, 1909.
2 SHEETS—SHEET 1.
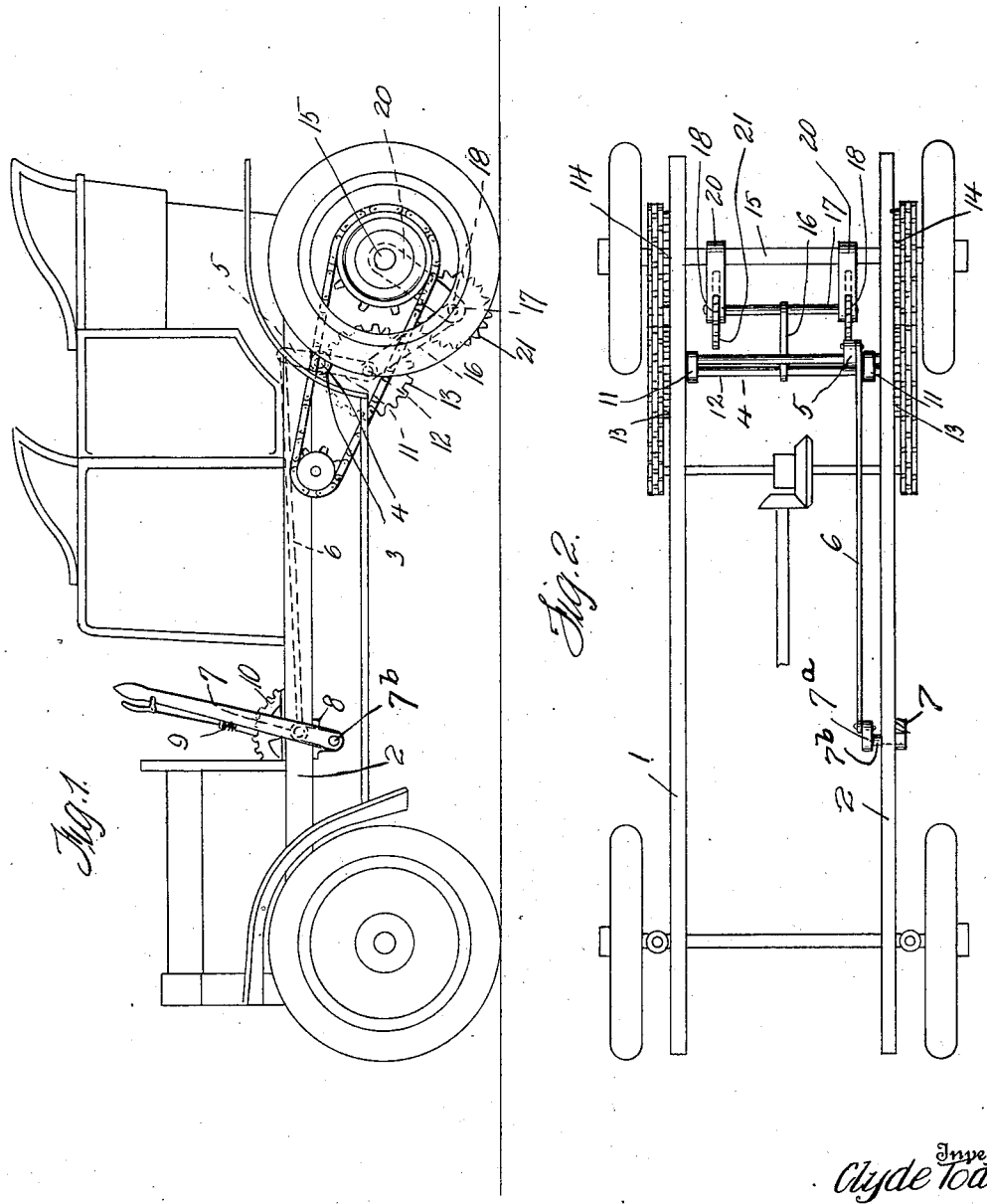
Witnesses
Samuel Payne
R. H. Butler
Inventor
Clyde Todd.
By H.C. Evert & Co.
Attorneys

C. TODD.
AUTOMOBILE BRAKE.
APPLICATION FILED JUNE 25, 1909.

937,557.

Patented Oct. 19, 1909.
2 SHEETS—SHEET 2.

Witnesses
Samuel Payne
K. H. Butler

Inventor
Clyde Todd.

By H. C. Everts
Attorneys.

UNITED STATES PATENT OFFICE.

CLYDE TODD, OF PITTSBURG, PENNSYLVANIA.

AUTOMOBILE-BRAKE.

937,557.

Specification of Letters Patent.   Patented Oct. 19, 1909.

Application filed June 25, 1909.   Serial No. 504,304.

*To all whom it may concern:*

Be it known that I, CLYDE TODD, a citizen of the United States of America, residing at Pittsburg, in the county of Allegheny and State of Pennsylvania, have invented certain new and useful Improvements in Automobile-Brakes, of which the following is a specification, reference being had therein to the accompanying drawing.

This invention relates to automobile brakes, and the invention has for its object to provide an automobile or a similar motor driven vehicle with a novel brake that will frictionally engage the surface over which the automobile passes and retard the motion of said automobile and eventually cause a cessation in the operation of the same.

The above object is attained by providing an automobile with road gripping wheels or shoes adapted to be lowered into engagement with a road for retarding the movement of an automobile, without subjecting any of the operable parts of the machine to undue stresses and strains.

The automobile brake will be hereinafter considered in detail and then claimed, and reference will now be had to the drawings forming a part of this specification, wherein there is illustrated a preferred embodiment of the invention; but it must be understood that the structural elements thereof can be varied or changed without departing from the spirit of the invention.

Figure 3:
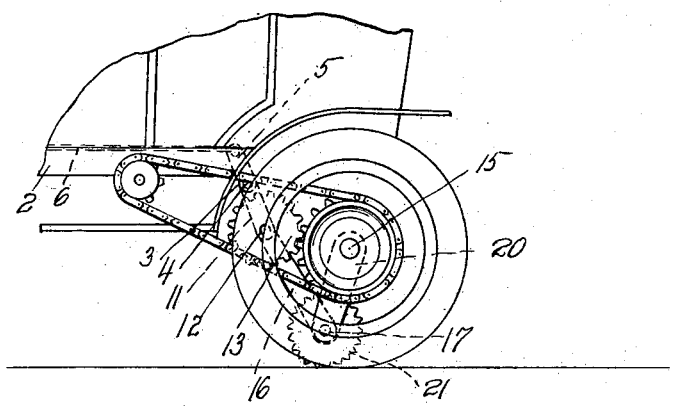
Figure 4:
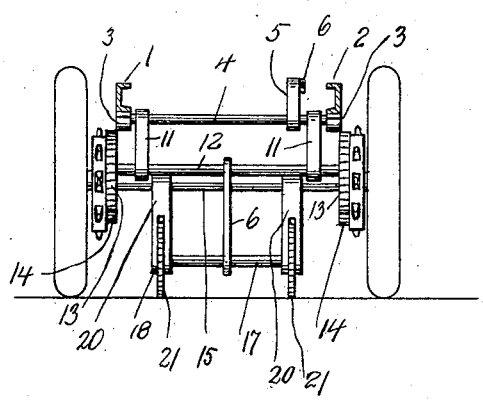

In the drawings:—Figure 1 is an elevation of an automobile showing the brake wheels or shoes in an elevated position, Fig. 2 is a plan of the running gear or frame of the automobile, Fig. 3 is a side elevation of a portion of the automobile with the brake wheels or shoes in a lowered position, and, Fig. 4 is a cross sectional view of the automobile illustrating the brake mechanism.

To put my invention into practice, I provide the longitudinal frames 1 and 2 of the machine with hangers 3 for a transverse rock shaft 4. Fixed upon this shaft is a crank 5 which is connected by a rod 6 to a crank 7$^a$, carried by a shaft 7$^b$, revolubly supported by a hanger 8, carried by the frame 2. The shaft 7$^b$ is provided with a lever 7 which is provided with a clutch mechanism 9 for locking the lever 7 in a fixed position, said clutch mechanism engaging a toothed sector or rack 10, carried by the frame 2 adjacent to the driver's seat of the machine. The transverse shaft 4 is provided with two depending cranks 11 and revolubly mounted in the lower ends of said cranks is a shaft 12, said shaft having the ends thereof provided with spacing toothed wheels 13, similar to gear-wheels, these toothed wheels are adapted to engage similar wheels 14 mounted upon the rear axle 15 of the machine. The shaft 12 is provided with a central depending link 16, said link being loosely connected to the shaft, while the lower end thereof is loosely connected to a shaft 17 journaled in the bifurcated ends 18 of hangers 20 loosely mounted upon the axle 15. Mounted upon the shaft 17 in the bifurcations of the hangers 20 are toothed brake wheels or shoes 21 adapted to engage the road or surface over which the machine travels. The toothed spacing wheels 13 are employed to limit the movement of the hangers 20 and prevent the toothed brake wheels 21 from being swung rearwardly beneath the axle 15, to that extent as to cause an abrupt stop of the vehicle.

It is apparent that when the lever 7 is swung forward by the driver or operator of the machine that the toothed brake wheels or shoes are immediately thrown into engagement with the road or street over which the automobile is traveling, and these wheels or shoes will be prevented from being accidentally injured or stripped of their teeth, while the brake power considerably depends upon the position of the lever 7 and to what extent the same is forced forwardly.

The braking mechanism as herein described is applicable to various types of motor driven vehicles and in its entirety is constructed of strong and durable metal.

Having now described my invention what I claim as new, is:—

1. In an automobile brake, the combination with the longitudinal frames and rear axle of the automobile, and toothed wheels mounted upon said axle, of a transverse rock shaft carried by said frames, an operating lever carried by one of said frames for rocking said shaft, cranks carried by said rock shaft, a shaft journaled in said cranks, spacing wheels mounted upon said shaft and adapted to engage the toothed wheels of said axle, a link loosely connected to said shaft, bifurcated hangers loosely mounted upon said axle, a shaft journaled in said link and said hangers, and toothed wheels or shoes mounted upon said shaft in the bifurcations of said hangers.

2. In an automobile brake, the combination with the longitudinal frames and rear axle of the automobile, of a rock shaft supported by said frames, an operating lever carried by one of said frames for rocking said shaft, a shaft revolubly supported by said rock shaft, spacing wheels carried by said shaft, bifurcated hangers loosely mounted upon said axle, toothed braking wheels revolubly mounted in the bifurcations of said hangers, and means connecting the last mentioned shaft with said hangers for raising and lowering said hangers by an actuation of said rock shaft.

In testimony whereof I affix my signature in the presence of two witnesses.

CLYDE TODD.

Witnesses:
H. C. EVERT,
A. J. TRIGG.